(12) United States Patent
McCormack et al.

(10) Patent No.: US 8,402,088 B2
(45) Date of Patent: Mar. 19, 2013

(54) ESTABLISHING TELEPHONE CALLS AT A SPECIFIED FUTURE TIME USING A URI AND A WEB-BASED TELEPHONY APPLICATION

(75) Inventors: Tony McCormack, Galway (IE); Joseph Smyth, Dangan (IE); Michael Hartman, Kilcolgan (IE)

(73) Assignee: Apple Inc., Cupertino, CA (US)

( * ) Notice: Subject to any disclaimer, the term of this patent is extended or adjusted under 35 U.S.C. 154(b) by 1862 days.

(21) Appl. No.: 09/878,874

(22) Filed: Jun. 11, 2001

(65) Prior Publication Data

US 2002/0188680 A1  Dec. 12, 2002

(51) Int. Cl.
*G06F 15/16* (2006.01)
*H04M 3/42* (2006.01)

(52) U.S. Cl. ............ 709/204; 379/202.01; 370/260; 370/261; 370/328; 370/338; 370/401

(58) Field of Classification Search .......... 709/200–205, 709/217–219, 227, 230, 228; 718/100, 101–103; 719/310, 311, 317, 316; 455/400, 401, 426, 455/412, 517, 558; 708/109; 725/99; 379/88.19, 379/67.1, 202.01, 93.21; 340/7.29; 370/328, 370/338, 401, 260, 261
See application file for complete search history.

(56) References Cited

U.S. PATENT DOCUMENTS

| | | | | |
|---|---|---|---|---|
| 5,909,487 A | * | 6/1999 | Mainker | 379/209.01 |
| 5,933,482 A | * | 8/1999 | Jung | 379/159 |
| 5,995,608 A | * | 11/1999 | Detampel et al. | 379/205.01 |
| 5,996,010 A | * | 11/1999 | Leong et al. | 709/223 |
| 6,192,123 B1 | * | 2/2001 | Grunsted et al. | 379/350 |
| 6,215,790 B1 | * | 4/2001 | Voit et al. | 370/401 |
| 6,272,214 B1 | * | 8/2001 | Jonsson | 379/202.01 |
| 6,418,214 B1 | * | 7/2002 | Smythe et al. | 379/202.01 |
| 6,549,773 B1 | * | 4/2003 | Linden et al. | 455/426.1 |
| 6,574,216 B1 | * | 6/2003 | Farris et al. | 370/352 |
| 6,626,957 B1 | * | 9/2003 | Lippert et al. | 715/513 |
| 6,798,753 B1 | * | 9/2004 | Doganata et al. | 370/260 |
| 6,857,021 B1 | * | 2/2005 | Schuster et al. | 709/227 |
| 6,871,212 B2 | * | 3/2005 | Khouri et al. | 709/204 |
| 6,876,734 B1 | * | 4/2005 | Summers et al. | 379/202.01 |
| 6,928,463 B1 | * | 8/2005 | Tene et al. | 709/203 |
| 6,961,416 B1 | * | 11/2005 | Summers et al. | 379/202.01 |
| 2001/0054070 A1 | * | 12/2001 | Savage et al. | 709/204 |
| 2002/0056129 A1 | * | 5/2002 | Blackketter et al. | 725/112 |
| 2002/0065828 A1 | * | 5/2002 | Goodspeed | 707/100 |

(Continued)

*Primary Examiner* — Haresh N Patel
(74) *Attorney, Agent, or Firm* — Meyertons, Hood, Kivlin, Kowert & Goetzel, P.C.

(57) ABSTRACT

Web-based telephony applications have recently been developed whereby a user is able to access a web-site and click on links or buttons in order to establish a voice over internet protocol telephone call from for example, his or her PC phone, to another user at another telephone terminal (PC phone or other suitable type of telephone). By enabling a web-based telephony application to receive URIs containing time information it is possible to enable telephone calls (including conference calls) to be initiated automatically at specified times or for feature keys on a user's telephone terminal to be programmed such that when activated at a particular time, a specified telephone call is initiated. In addition, URIs comprising time information may be used to set up "follow-me" functionality whereby all calls to a particular user are directed to different pre-specified directory numbers depending on the time of day. In another example, URIs comprising time information are used to route calls to contact-center agents in order to reduce the burden on contact center routing applications. URIs comprising time information are also advantageously used to communicate information to other entities.

14 Claims, 3 Drawing Sheets

U.S. PATENT DOCUMENTS

| | | | |
|---|---|---|---|
| 2002/0091769 A1* | 7/2002 | Drozdzewicz et al. | 709/204 |
| 2002/0103864 A1* | 8/2002 | Rodman et al. | 709/204 |
| 2002/0116505 A1* | 8/2002 | Higgins et al. | 709/227 |
| 2002/0131565 A1* | 9/2002 | Scheuring et al. | 379/88.19 |
| 2003/0021400 A1* | 1/2003 | Grandgent et al. | 379/202.01 |
| 2003/0037109 A1* | 2/2003 | Newman et al. | |
| 2003/0181205 A1* | 9/2003 | Yiu et al. | 455/426.1 |

\* cited by examiner

ESTABLISHING TELEPHONE CALLS AT A SPECIFIED FUTURE TIME USING A URI AND A WEB-BASED TELEPHONY APPLICATION

FIELD OF THE INVENTION

The present invention relates to a method and apparatus to establish a telephone call over a communications network at a specified time using a web-based telephony application.

BACKGROUND TO THE INVENTION

Web-based telephony applications have recently been developed whereby a user is able to use web-based tools and software in order to establish a telephone call, from for example, his or her PC phone, to another user at another telephone terminal (e.g. standard desktop or PC phone or any other suitable type of telephone). The means by which the user initiates the telephone call is predominantly through world-wide-web addresses that contain information that can be used to identify the person to which the call is placed, e.g. a Uniform Resource Locator (URL) with embedded Directory Number (DN) information. In the context of this document, a system which processes such a URL to identify a called-party and establish a telephony call to that called-party is referred to as a Web-based Telephony Application (WTA).

Known telephony systems are independent of and separate from applications on the user's PC, such as the user's calendar or diary. This means that the end user needs to manage inter-relationships between the telephony system and his or her other personal software tools. This is often complex and time consuming. To illustrate the example further, consider the case where a user has several scheduled calls and/or telephone conferences to participate in during the day. To efficiently manage these calls, it is necessary for the user to manually enter telephone numbers, conference passcodes, and scheduled times into the aforementioned personal software tools. The format of this information and in particular the telephone numbers and timing information is in general unfamiliar to an unskilled user.

Another problem is that existing telephony systems cannot easily take into account the needs of users who have several different contact numbers that they use throughout a particular day. For example, a person may have a cellular telephone, a work telephone and a home telephone. A web-based telephony application ideally needs to be able to take this into account so that a caller has a single address/number that can be used to receive a call at irrespective of the time of day Other problems arise associated with conference calls. Typically, conference calls have been arranged by making a reservation on a conference bridge for which a conference bridge telephone number and a password are issued. The conferencees (also referred to as participants) are required to dial the unfamiliar conference bridge number and enter the password. This is complex and time consuming for the users, especially those having many conference calls throughout the day.

Another example of time information being relevant to placing a call is a web-based telephony application, used by enterprises to enable end users to select links on a web site to access a call centre. In this type of situation, the web site typically provides access to the central call centre telephone number rather than to particular call centre agents. An automated answering device representing the call centre telephone number then routes the call to the correct call centre agent depending on various factors. One common factor used to route the call in such applications is the time-of-day. In a simple example, outside of office hours the caller is directed to voice-mail. If this routing could occur external to the call-center's telephony system, significant computer processing could be off-loaded from the call-centre's telephony system to an external system.

An object of the present invention is to provide a method and apparatus for establishing a telephone call over a communications network at a specified time using a web-based telephony application which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided a method of establishing a telephone call over a communications network at a specified time using a web-based telephony application, said method comprising the steps of:
  accessing a uniform resource identifier (URI) comprising the specified time and also comprising information about the call destination; and
  at the time specified in the URI, setting up a telephone call to the destination specified in the URI.

This provides the advantage that time information is provided to the web-based telephony application in a convenient manner, using a URI. The web-based telephony application receives the URI and, at the time specified, sets up a telephone call to the specified destination.

The invention allows setup of telephony calls at the time web-links are activated, as well as scheduling calls for some time in the future. This is advantageous over traditional existing WTAs in many situations.

Preferably, the step of accessing the URI comprises receiving the URI from another entity selected from a web-based software application and a software application on a user terminal. For example, a web-based conferencing application may be arranged to forward a URI to the web-based telephony application which contains information about a conference bridge reservation number and time. In another example, a diary or calendar application on a user's PC forwards a URI containing a directory number and a time for a scheduled call to the web-based telephony application.

Preferably the URI comprises time zone information. For example, the URI comprises a string which indicates whether Greenwich Mean Time (GMT) applies, or whether another time zone is being used. This provides the advantage that entities in different time zones are able to correctly interpret such URIs.

Advantageously, the URI further comprises one or more directory numbers. This enables the web-based telephony application to access the directory number information and use this to set up a telephone call at the times indicated in the URI. For example, the URI contains the DN for a conference call and this enables the web-based telephony application to automatically establish the conference call without a user needing to dial an unfamiliar conference call number. Furthermore, since the passcode for the conference bridge can also be embedded in the URI, once the URI is accessed by the user and received by the web-based telephony application, the user is accepted into the conference.

In one example, the URI comprises a plurality of directory numbers and a plurality of time ranges, one for each directory number. This enables the web-based telephony application to set up telephone calls to the different directory numbers depending on the current time. For example, this can be used to provide a "follow-me" service whereby all incoming calls to a particular person are directed to different instances of that person's pre-specified DNs according to the time of day.

In another example, the web-based telephony application sets up telephone calls to particular contact-centre agents depending on the current time. This is achieved, for example, through use of hyper text mark-up language (HTML) whereby several URLs with time information are provided in a web-page, but only one is sent to the web-server when the link is selected. This reduces demand on any routing application at the contact-centre itself since the routing is effectively achieved in a distributed manner.

According to another aspect of the present invention there is provided a web-based telephony application for establishing a telephone call over a communications network at a specified time, said web-based telephony application comprising:
  an input arranged to access a uniform resource identifier (URI) comprising the specified time and also comprising information about a call source and destination; and
  a computer program arranged to control a telephony apparatus in order to set up a telephone call at the time specified in the URI between the source and destination specified in the URI.

According to another aspect of the present invention there is provided a signal for setting up a telephone call over a communications network said signal comprising a uniform resource identifier which itself comprises time information. This provides the advantage that time information is sent as part of a URI and can be used, for example, by a web-based telephony application, to schedule and initiate telephone calls at particular times.

According to another aspect of the present invention there is provided a web server hosting at least one object, each of which is associated with a uniform resource identifier comprising time information. The web-based telephony application, itself running on a web-server, receives the URI and obtains the time information from that URI. Action may then be taken on the basis of the time information, for example, a telephone call set up at the particular time.

According to another aspect of the present invention there is provided a web-browser which is arranged to receive a plurality of URIs each comprising time information and to select one of the URIs on the basis of the time information in each of the URIs.

According to another aspect of the present invention there is provided a software application which is arranged to control a processor which is connected to a communications network such that uniform resource identifiers (URIs) are created which comprise time information and are sent to other entities within the communications network. For example, the software application may be a calendar program on a user's PC.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

The term "uniform resource identifier (URI)" is used to refer to a string which identifies a resource in the internet or other internet protocol communications network. For example, a resource may be a document, image, downloadable file, service, or electronic mailbox. A uniform resource locator (URL) is an example of a URI which is associated with a popular URI scheme such as HTTP, FTP, MAILTO etc. For example, a file called "test.html" on HTTP server "www.server.domain" in directory "pub/files" has a URI of:
  http://www.server.domain/pub/files/test.html The term "telephony call" is used herein to refer to conventional voice calls as well as multimedia calls which comprise video or web based content, or any other suitable type of content.

The term "web-server" is used to refer to any server that is arranged to receive a request via specification of a URI. For example, HTTP servers and SIP servers are both examples of web-servers.

The term "web-browser" is used to refer to any client system or application that is arranged to generate a request via specification of a URI. For example, conventional PC web-browsers and SIP (session initiation protocol) clients are both examples of web-browsers.

The term "web-based telephony application" is used to refer to software provided on a web-server which is arranged to enable a user to make telephone calls over a communications network.

A web-based telephony application suitable for use in the present invention is now described with reference to FIG. 1 and in which the web-based telephony application is used to make voice over internet protocol (VoIP) telephony calls. However, it is also possible to use the web-based telephony application to make telephony calls over a public switched telephony network.

Figure 1:
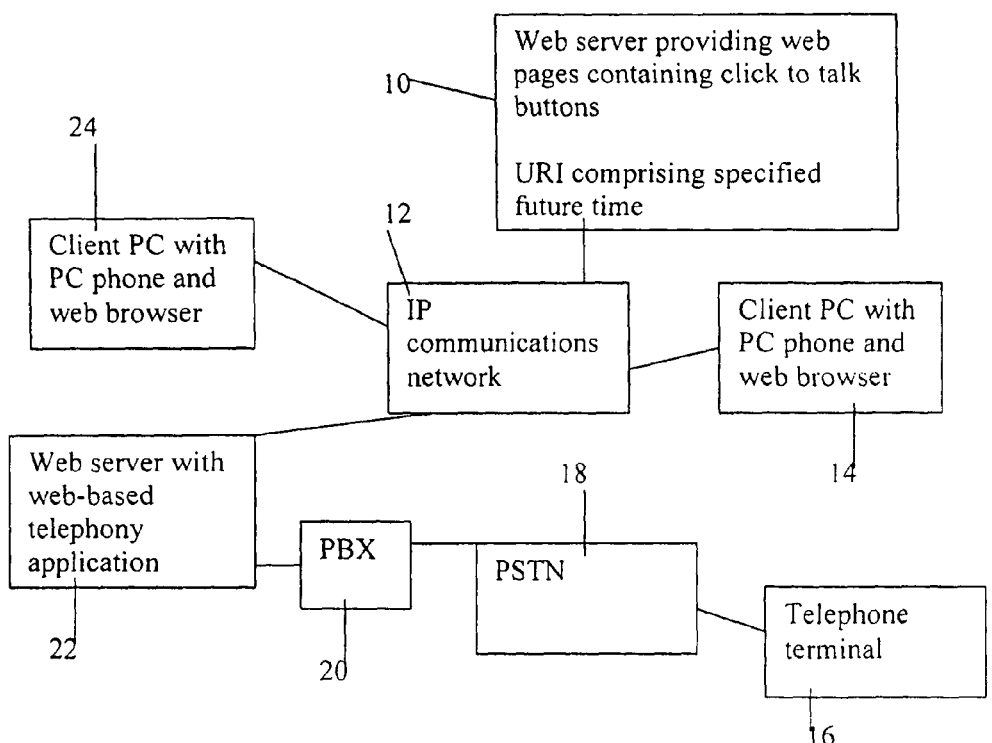
FIG. 1 is a schematic diagram of a web-based telephony application in a communications network.

FIG. 1 is a schematic diagram of a web-based telephony application in a communications network. A web server 10 is connected to an internet protocol communications network 12. The web server provides web pages that comprise "click to talk" buttons which when selected by a user cause a telephone call to be set up between a DN pre-specified by the user and a specified destination. For example, the web pages may advertise the services of a company and the click to talk button may enable users to start a telephone call to an advisor at the company. A client personal computer (PC) or other terminal is connected to the internet protocol communications network 12 and comprises a web browser. Using this terminal a user is able to view the web pages provided by the web server 10 and select the "click to talk" buttons. The PC may also comprise a PC telephone 24 or be associated with an internet telephone which enables the user to make voice over internet protocol (VoIP) telephone calls. For example, an i2004 telephone as commercially available from Nortel Networks may be used. Other client PCs 14 are also connected to the internet protocol communications network 12.

Another web server 22 comprising a web-based telephony application is connected to the internet protocol communications network 12. This web-server 22 is interfaced to a telephony switch such as a private branch exchange (PBX) 20. The telephony switch itself is connected to a voice communications network such as a public switched telephone network (PSTN) 18 which comprises telephone terminals 16.

The web-based telephony application comprises a Click-to-Talk (C2T) service which allows a user (A) to click an hyper text mark-up language (HTML) hyperlink (for example, an HTML button or hypertext reference (HREF) anchor) to establish a telephony call. The telephony call is made to a certain telephone number or skillset (B), which is specified by the provisioner of the service. This is achieved by specifying the telephone number B in a URI which is the target of the HTML hyperlink.

When user (A) clicks the hyper link, user (A)'s browser connects by conventional operation to the C2T application residing on the web-based telephony application server. The address of the web-based telephony application server is also specified in the URI by the service provisioner. At this point, the C2T application, by prior arrangement, makes note of the intended communication party (B), for future reference.

At the same time, user (A)'s browser by conventional operation, presents to the C2T application any relevant HTTP cookies that have previously been stored on user A's terminal. For example, cookies may have been stored on User A's terminal during previous interaction between User A's browser and the C2T service.

Such presented cookies, if any, may by prior arrangement of the C2T application server contain information identifying user (A), including in particular user (A)'s telephone number.

If no such cookie is presented, then the C2T application is arranged to send to user (A)'s browser a web page encompassing a request to user (A) to provide identifying information including user (A)'s telephone number, and also encompassing a mechanism to allow user (A)'s browser to accumulate this information and send it back to the C2T application by conventional operation.

User (A)'s browser then displays this request and allows user (A) to specify the information and invoke the mechanism by which the browser can send the information back to the C2T application.

At this point, the C2T application has been sent user (A)'s telephone number by the browser, through either of the methods described above, and it makes note of this information for future reference.

The C2T application is arranged to then determine the telephone number of party (B). This is done by examining the information in the URI described above, and determining if the information is a telephone number or a skillset name. If it is a telephone number, this number is noted for future reference. If it is a skillset name, the C2T application is arranged to query a database of skillset names, extract a corresponding telephone number for the skillset, and make note of this telephone number for future reference.

The C2T application is arranged to then initiate a telephony connection between the telephone number of party (B) which was noted for future reference through either of the two methods described above, and the telephone number of party (A) which was noted for future reference as described above. The form of this telephony connection is immaterial to this discussion provided there is an asynchronous voice path between the devices corresponding to the telephone numbers for parties (A) and (B), and that call control signalling initiated by one of the parties can effect call state changes or device state changes at the other party. For the sake of illustration a conforming type of telephony connection involves a tele-conference involving a third party used as a programmatic call control point and signalling proxy by the C2T application. The C2T application server is arranged to provide a telephony connection conforming to these conditions.

The C2T application is further arranged to send a response using conventional means to user (A)'s browser with a request for the browser to use its conventional means to store a cookie containing the identifying information including user (A)'s telephone number, as previously specified by user (A). This cookie may at some time in the future be sent back to the C2T application server by the browser as per the scenario described above, such that subsequent use of the C2T application by user (A) using the same browser, will be facilitated in a less obtrusive manner.

The C2T application is further arranged to then send an additional part of the response described above to user (A)'s browser using conventional operation. This additional part of the response comprises a web page with a confirmation that the requested telephony connections are being initiated.

The present invention involves using URIs which further comprise time information and may also comprise date information as well as time zone information. The web-based telephony application is modified in order that it can deal with such URIs. There are many different uses to which such a system can be put although these all involve setting up telephone calls at particular times.

The examples now described involve sending URIs which comprise time information. These URIs can be sent, received and processed by any type of client and server and any type of protocol, although in the examples that follow, web-based clients and servers and web-based HTTP protocols are mentioned.

Figure 2:
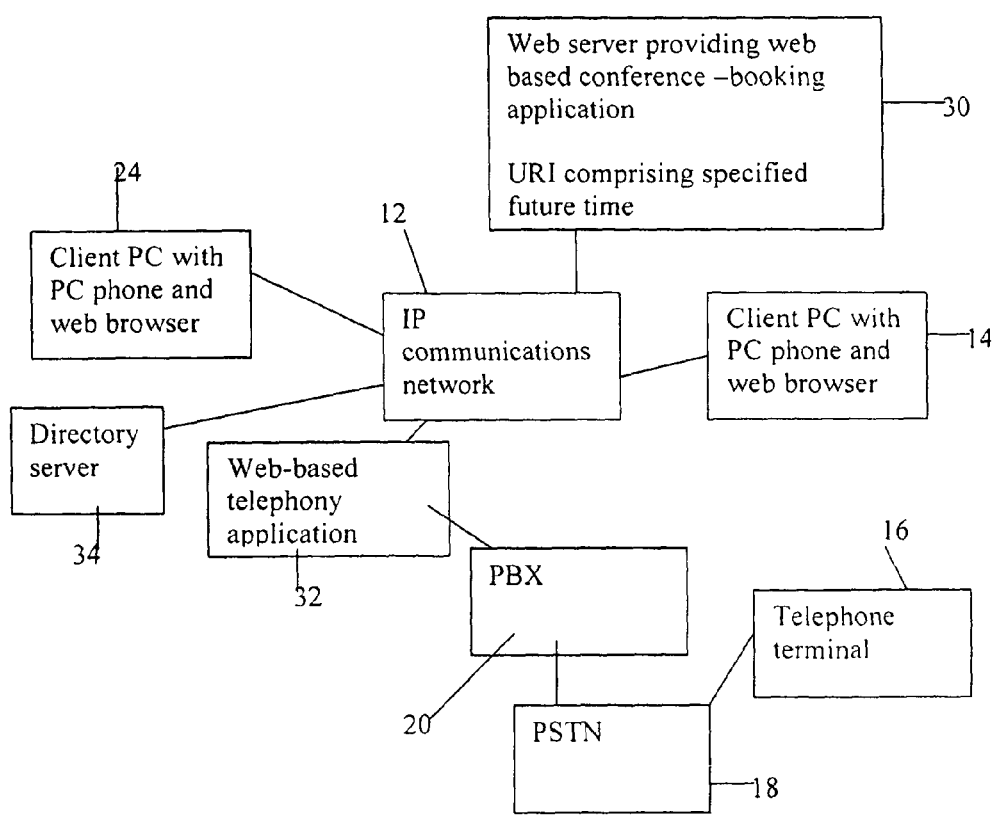
FIG. 2 is a schematic diagram of a web-based telephony application arranged to be used with a conference booking application in a communications network.

FIG. 2 illustrates a first example in which conference call participants are automatically dialled into a conference bridge at a pre-specified time. The same reference numerals are used in FIG. 2 as for FIG. 1 for corresponding components. A first web server 30 provides a web-based conference booking service and is connected to the IP communications network 12. The web-based telephony application 32 is modified in order to receive URIs comprising time information. A directory server 34 is also available; this server comprises a database of email addresses and corresponding DNs for users and is also connected to the IP communications network 12.

A user of the client PC 24 operates the web browser and views web pages provided by the web-based conference booking application 30. The user enters details of the proposed time and date for the conference call and selects or enters email addresses of the other proposed participants (conferencees). It is not essential for the user to enter the email addresses of the other proposed participants; instead DNs for those participants may be entered or any other suitable information that can be used to identify those DNs. The user may also select his or her desired port usage.

The web-based conference booking application takes this information and provides a conference bridge booking comprising a DN for the conference call, a password, and a time.

The web-based conference application sends the DN for the conference call, the time and password for the conference call as well as the email addresses of the participants to the web-based telephony application. This is done by sending a URI in any suitable manner, for example, using HTTP, an email or a session initiation protocol (SIP) message. The message format may be any suitable format. An example of a preferred format is given below:

Ano1@nortelnetworks.com/?DN1=1-123-45678?16-APR-2001-11.00GMT
Ano2@nortelnetworks.com/?DN1=1-123-45678?16-APR-2001-11.00GMT
Ano3@nortelnetworks.com/?DN1=1-123-45678?16-APR-2001-11.00GMT In this example, there are three proposed conferencees, whose email addresses are ano1@nortelnetworks.com, ano2@nortelnetworks.com and ano3@nortelnetworks.com and where the directory number for the conference call is 1-123-45678, the date of the call is Apr. 16, 2001 and the time of the call is 11.00 GMT. In this example, a password for the conference is not included in the message. However, a password can be included, preferably in an overtyped form.

When the web-based telephony application receives this information it converts the email addresses into the associated DNs by requesting this information from the directory server 34.

The web-based telephony application processes the URIs and sets up the conference call automatically at the appropriate time specified in the URIs. Thus the individual conferencees are not required to dial into the conference themselves and do not have to dial the conference number and enter a password.

Figure 3:
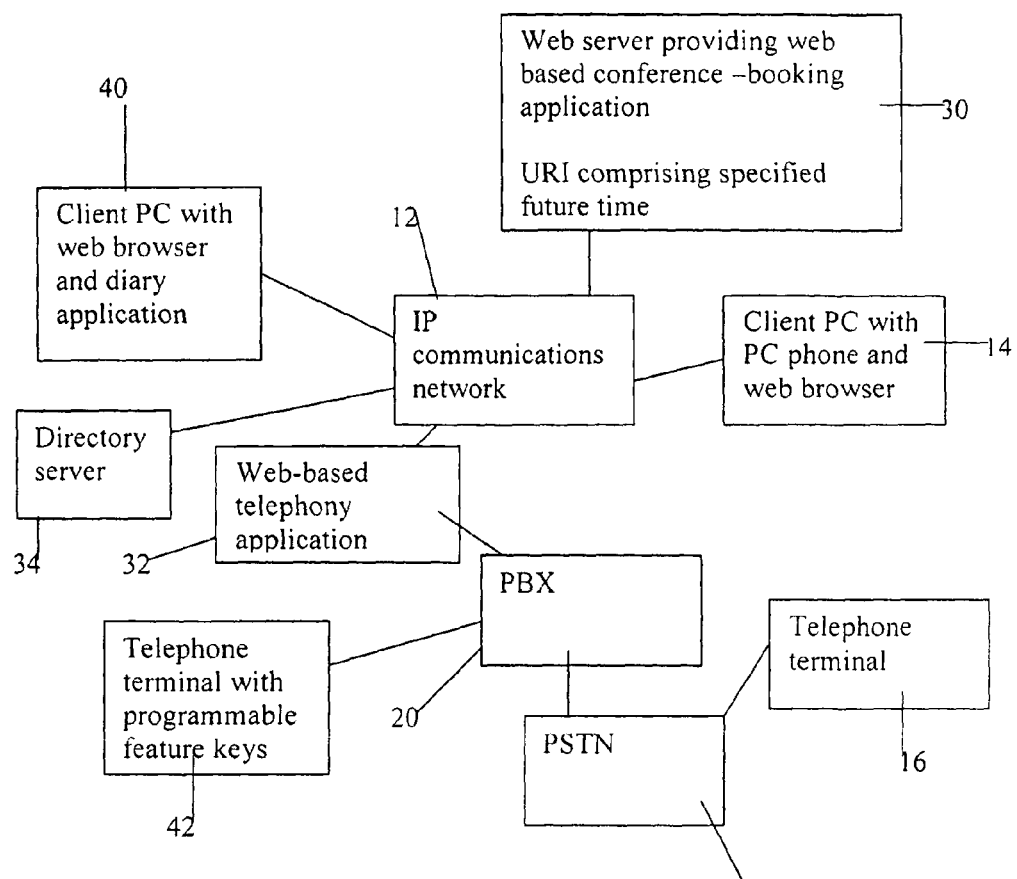
FIG. 3 is a schematic diagram of the web-based telephony application of FIG. 2 modified to operate with a software application on a user terminal.

FIG. 3 shows a situation where a user has a calendar application on his or her PC 40 and this calendar application is arranged to send URIs comprising time information to the web-based telephony application 32. It is not essential to use a calendar application. Any suitable application which needs to send time information to a web-based telephony application may be used.

In this example, a telephone terminal that has programmable feature keys 42 is shown which is connected (indirectly) to the PBX 20. The user of the client PC 40 is also the user of the telephone terminal with programmable feature keys 42. Other components in FIG. 3 which correspond to components in FIGS. 1 and 2 are given corresponding reference numerals.

Consider a situation where the user has a plurality of telephone calls listed in his or her calendar application on the client PC 40. The telephone calls are scheduled at various times during the day and details of the destination parties and their DNs are also listed.

The calendar application is arranged to form a URI for each of the telephone calls and send these to the web-based telephony application 32. The URIs are sent either via HTTP, email or using a protocol such as SIP, or in any other suitable manner.

The URIs comprise the DN of the user's telephone terminal with programmable feature keys 42 and the DN of the destination terminal as well as the time and date for the telephone call. The URI also contains the web address of the web-based telephony application. An example form for the URI is:

www.ebusinesslink.com/?DN1=12345?DN2=54321?TIME=04MAR-2001-11:00

Once the web-based telephony application receives a URI it extracts the DN and time information and instructs the PBX 20 to set up the call at the appropriate time.

Since the PBX has full control over the feature keys on the user's telephone terminal, it is also possible to automatically program one or more of these feature keys on the user's telephone terminal 42. In this case, instead of automatically setting up a scheduled telephone call at the appropriate time, a feature key on the user's telephone terminal 42 is configured such that when the user presses that key during the time specified for the call, the call is initiated. Any suitable mechanism for controlling user telephone terminals from the PBX is used, as is known in the art.

In another example, the user's telephone terminal 42 is provided with a display screen which is able to display URIs or the information contained in URIs. The web-based telephony application receives URIs from the user's PC and stores these. The web-based telephony application also displays the URIs on the user's telephone terminal in order that the user is able to scroll through a list of URIs displayed on his or her terminal and determine what calls are scheduled, when these are scheduled and to which DNs the calls are. The web-based telephony application (or the telephone terminal itself) may filter the URIs using the time information such that only those calls scheduled in a particular time range are displayed. As before, a feature key is programmed for the most imminent call such that when the user presses this key during the time for that call, the telephone call is initiated.

By enabling feature keys on a telephone terminal to be programmed in this way, those feature keys are effectively dynamically linked to the application on the user's PC, such as a calendar application.

In another embodiment URIs comprising time information are used to provide a "follow-me" service. Consider a user who has more than one telephone such as a mobile telephone, a work telephone and a home telephone. The user wishes his or her incoming calls to be directed to one of these telephones depending on the time of day. In order to achieve this, URIs comprising the DNs for each of the telephones together with associated time ranges are used. An example of such a URI is:

www.ebusinesslink.com/?DN=1-123-45678?09:00-17:00GMT?DN=1-321-87654?17:00-19:00GMT?DN=1-123-91011?19:00-09:00GMT A user or other entity is able to send a URI of this type to the web-based telephony application 32 which then controls the PBX 20 such that any incoming calls for the user are directed to DN 1-123-45678 if they arrive between 9 am and 5 pm GMT, or to DN 1-321-87654 if they arrive between 5 pm and 7 pm GMT, or to DN 1-123-91011 if they arrive between 7 pm and 9 am GMT.

For example, this type of URI may be used on a corporate web site in order to direct calls to a help desk or other contact centre for customer service requests. When a user browses the web site and selects a button or other item to initiate a telephone call to the contact centre the URI is sent to a web-based telephony application as described above. The URI comprises DNs for a plurality of different agents at one or more contact centres which may be in different time zones. Time ranges are given in the URI for each of the DNs. The browser determines the appropriate URI to send to the web-based telephony application based on the time at which the URI is selected. For example, the web-browser comprises a parser which is arrange to parse URIs which themselves comprise time information. If a web-server provides a plurality of URIs, each comprising time information, the web-browser is arranged to act upon only one of the URIs. For example, the web-browser selects which URI to act upon by comparing the time information in the URIs and the current time of day. However, this is not essential, the web-browser can pick which URI to act upon using the time information in any suitable manner. In this way calls are directed to appropriate contact centres and agents depending on the time of day and it is not necessary for processing capability at the actual contact centre to perform this function. This has the significant advantage that part of the call-routing is carried out in a distributed manner, reducing the overhead on any contact-centre routing application.

The invention claimed is:

1. A method of establishing a telephone call over a communications network between a call source and one of a plurality of call destinations using a web based telephony application hosted by a web server, said method comprising the steps of:
   (i) receiving at the web server a uniform resource identifier (URI) comprising a specified future time relative to a time of creation of the URI, information about the plurality of call destinations for a plurality of different agents at one or more contact centers and time ranges associated with said plurality of call destinations; and
   (ii) arranging the web based telephony application to access the URI in response to a call event to compare a current time with the associated time ranges to select an appropriate one of the plurality of call destinations according to the time comparison and at the specified future time to instruct a telephony apparatus in the communications system to establish said call to said selected one of the plurality of call destinations, wherein the call event comprises a user initiating a telephone call to one of said plurality of different agents through a corporate web site.

2. The method as claimed in claim 1 wherein said step (i) of receiving a URI comprises receiving the URI from an entity selected from a web site and a software application on a user terminal.

3. The method as claimed in claim 1 wherein said step (i) of receiving a URI comprises receiving the URI from a web-based conference call booking application.

4. The method as claimed in claim 1 wherein said plurality of call destinations comprise a plurality of telephony enabled devices belonging to a single user.

5. The method as claimed in claim 1 wherein said URI comprises time zone information.

6. The method as claimed in claim 1 wherein said information about the plurality of call destinations comprises a respective directory number (DN) for each of said plurality of call destinations.

7. The method as claimed in claim 1 wherein said call event comprises receiving an incoming call and said web based telephony application instructs said telephony apparatus to redirect said call to said selected one of the plurality of call destinations.

8. The method as claimed in claim 1 which further comprises instructing the telephony apparatus to display the URI at a telephone terminal at the call source.

9. A web-based telephony application for establishing a telephone call over a communications network between a source and one of a plurality of call destinations, said web-based telephony application embodied in a non-transitory computer-readable medium and being hosted by a web server, the web-based telephony application comprising:
   (i) an input arranged to receive a uniform resource identifier (URI) comprising a specified future time relative to a time of creation of the URI, information about the plurality of call destinations for a plurality of different agents at one or more contact centers and time ranges associated with said plurality of call destinations; and
   (ii) a computer program arranged to access the URI and in response to a call event to compare a current time with the associated time ranges to select an appropriate one of the plurality of call destinations according to the time comparison and at the specified future time to instruct a telephony apparatus in the communications system to establish said call to said selected one of the plurality of call destinations, wherein the call event comprises a user initiating a telephone call to one of said plurality of different agents through a corporate web site.

10. The web-based telephony application as claimed in claim 9, further comprising a web-browser arranged to receive said URI comprising said information about the plurality of call destinations and time ranges associated with said plurality of call destinations.

11. The web-based telephony application as claimed in claim 10, comprising a parser arranged to parse said URI.

12. The web-based telephony application as claimed in claim 9, wherein said plurality of call destinations comprise a plurality of telephony enabled devices belonging to a single user.

13. The web-based telephony application as claimed in claim 9, wherein the URI includes: password information; time zone information, address information; and protocol information.

14. The web-based telephony application as claimed in claim 9, wherein said call event comprises receiving an incoming call and said web based telephony application is arranged to instruct said telephony apparatus to redirect said call to said selected one of the plurality of call destinations.

* * * * *